(12) United States Patent
Gunning

(10) Patent No.: US 7,016,562 B2
(45) Date of Patent: Mar. 21, 2006

(54) OPTICAL SWITCH

(75) Inventor: Paul Gunning, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 10/451,526

(22) PCT Filed: Jan. 15, 2002

(86) PCT No.: PCT/GB02/00155

§ 371 (c)(1),
(2), (4) Date: Jun. 24, 2003

(87) PCT Pub. No.: WO02/056634

PCT Pub. Date: Jul. 18, 2002

(65) Prior Publication Data

US 2004/0037559 A1    Feb. 26, 2004

(30) Foreign Application Priority Data

Jan. 15, 2001    (EP) .................................. 01300311

(51) Int. Cl.
*G02B 6/26*    (2006.01)

(52) U.S. Cl. ...................................................... 385/16
(58) Field of Classification Search ................. 385/16; 398/54; 370/425
See application file for complete search history.

(56) References Cited

U.S. PATENT DOCUMENTS

| 5,479,395 | A  | * | 12/1995 | Goodman et al. | 370/438 |
| 6,219,353 | B1 | * | 4/2001  | Wight et al.   | 370/425 |
| 6,665,495 | B1 | * | 12/2003 | Miles et al.   | 398/54  |

* cited by examiner

*Primary Examiner*—Frank G. Font
*Assistant Examiner*—Eric Wong
(74) *Attorney, Agent, or Firm*—Nixon & Vanderhye P.C.

(57) ABSTRACT

An optical switch comprises a hub and a plurality of nodes with the hub being connected to each node by an optical communication link dedicated for clock signals and by an optical communication link dedicated or data signals. In use the hub transmits a clock signal to all of the nodes; each node re-transmits a copy of the clock signal to the hub and transmits a data signal to the hub. The hub returns each re-transmitted clock signal to its respective node and forwards a copy of each data signal to all of the nodes so that each node can receive a selected data signal by processing the re-transmitted clock signal.

17 Claims, 3 Drawing Sheets

OPTICAL SWITCH

This application is the US national phase of international application PCT/GB02/00155 filed 15 Jan. 2002 which designated the U.S.

BACKGROUND

1. Technical Field

This invention relates to the field of optical switches for communications networks and specifically optical switch fabrics.

2. Description of Related Art

Optical communications technology has advanced rapidly in recent years, with transmission systems capable of terabits per second now being deployed. However, advances in switching and routing technology have not been as dramatic, leading to system bottlenecks as signals are converted from optical format to electronic format for processing, before being re-converted to an optical format for onwards transmission.

BRIEF SUMMARY OF EXEMPLARY NON-LIMITING EMBODIMENTS

According to a first aspect of the present invention there is provided an optical switch, comprising a hub and a plurality of nodes, each node being connected to the hub by first optical communication link for clock signals and by second optical communication link for data signals; such that, in use: the hub transmits a clock signal to all of the nodes; in response to receiving said clock signal, each node re-transmits the clock signal to the hub and transmits a data signal to the hub; the hub transmitting each data signal to all of the nodes and returning each re-transmitted clock signal to its respective node, each node processing the re-transmitted clock signal to receive a selected data signal. Preferably, each node generates data signals by modulating the received clock signal. The clock signal may comprise a plurality of wavelength division multiplexed pulses and each data signal may comprise a plurality of wavelength division multiplexed data pulses.

Preferably, the data signal transmitted by each node has a temporal offset relative to the clock signal which is unique to the respective node. Additionally, the hub may transmit each data signal to all of the nodes and return each re-transmitted clock signal to its respective node, each node determining the respective temporal offset from the re-transmitted clock signal to receive a selected data signal.

According to a second aspect of the present invention there is provided a method of switching optical signals, the method comprising the steps of:

(a) transmitting a clock signal from a hub to a plurality of nodes;
(b) re-transmitting the clock signal back to the hub from each node;
(c) transmitting a data signal from each node to the hub;
(d) returning the re-transmitted clock signal to each respective node
(e) transmitting all of the received data signals from the hub to all of the nodes;
(f) at one or more of the nodes, processing the re-transmitted clock signal to select a data signal.

It is preferred that in step (c) the data signal transmitted by each node has a temporal offset relative to the clock signal which is unique to the respective node and that in steps (e) and (f), each node determines the respective temporal offset from the re-transmitted clock signal to receive a selected data signal.

BRIEF SUMMARY OF THE DRAWINGS

The invention will now be described, by way of example only, with reference to the following figures in which.

DETAILED DESCRIPTION OF EXEMPLARY NON-LIMITING EMBODIMENTS

Figure 1:
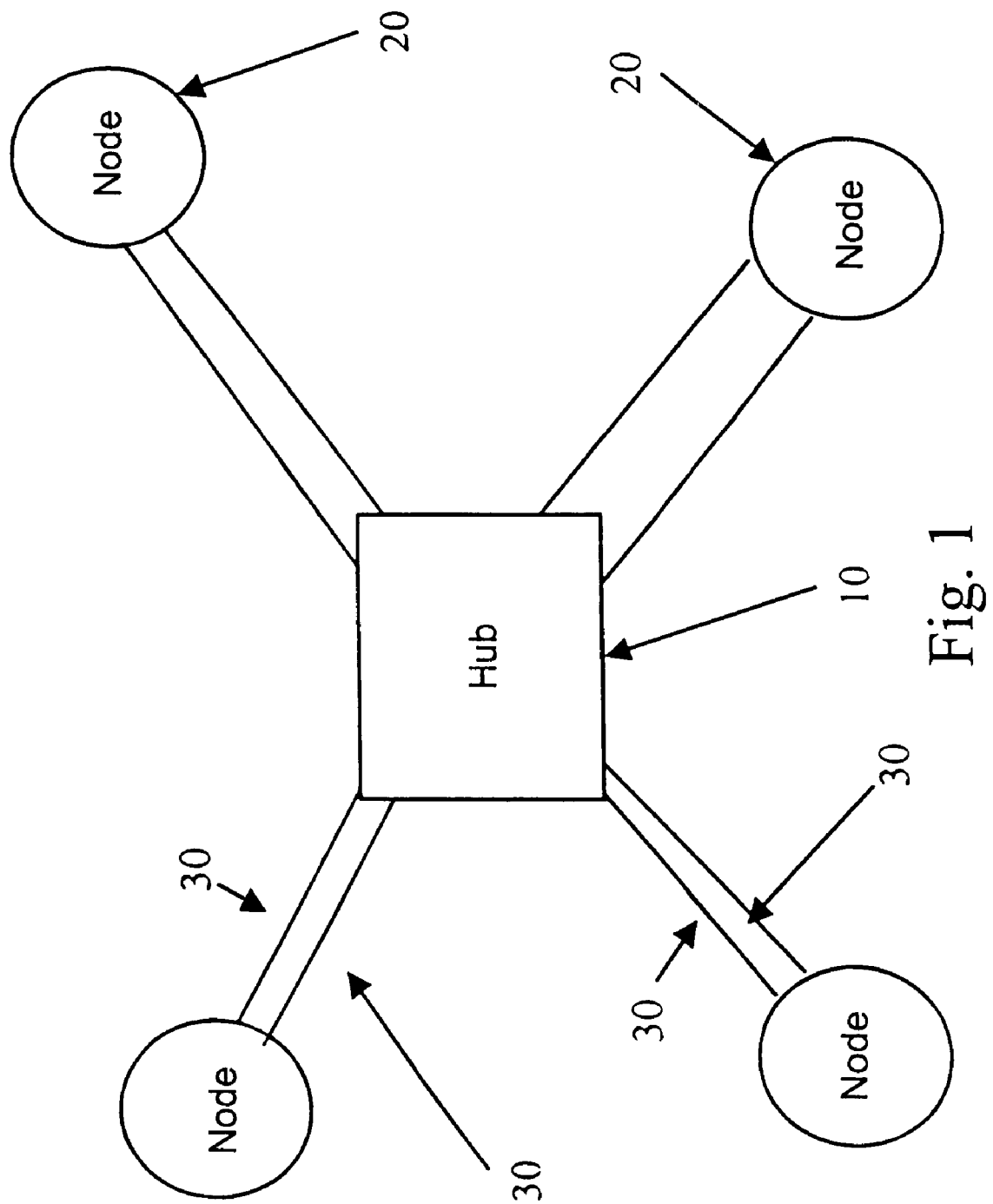
FIG. 1 shows an outline of an optical switch according to the present invention.

FIG. 1 shows a schematic depiction of an optical switch according to the present invention. The switch comprises a hub 10 which is in communication with a plurality of nodes 20, each of which is connected to the hub 10 by optical communication links 30.

Figure 2:
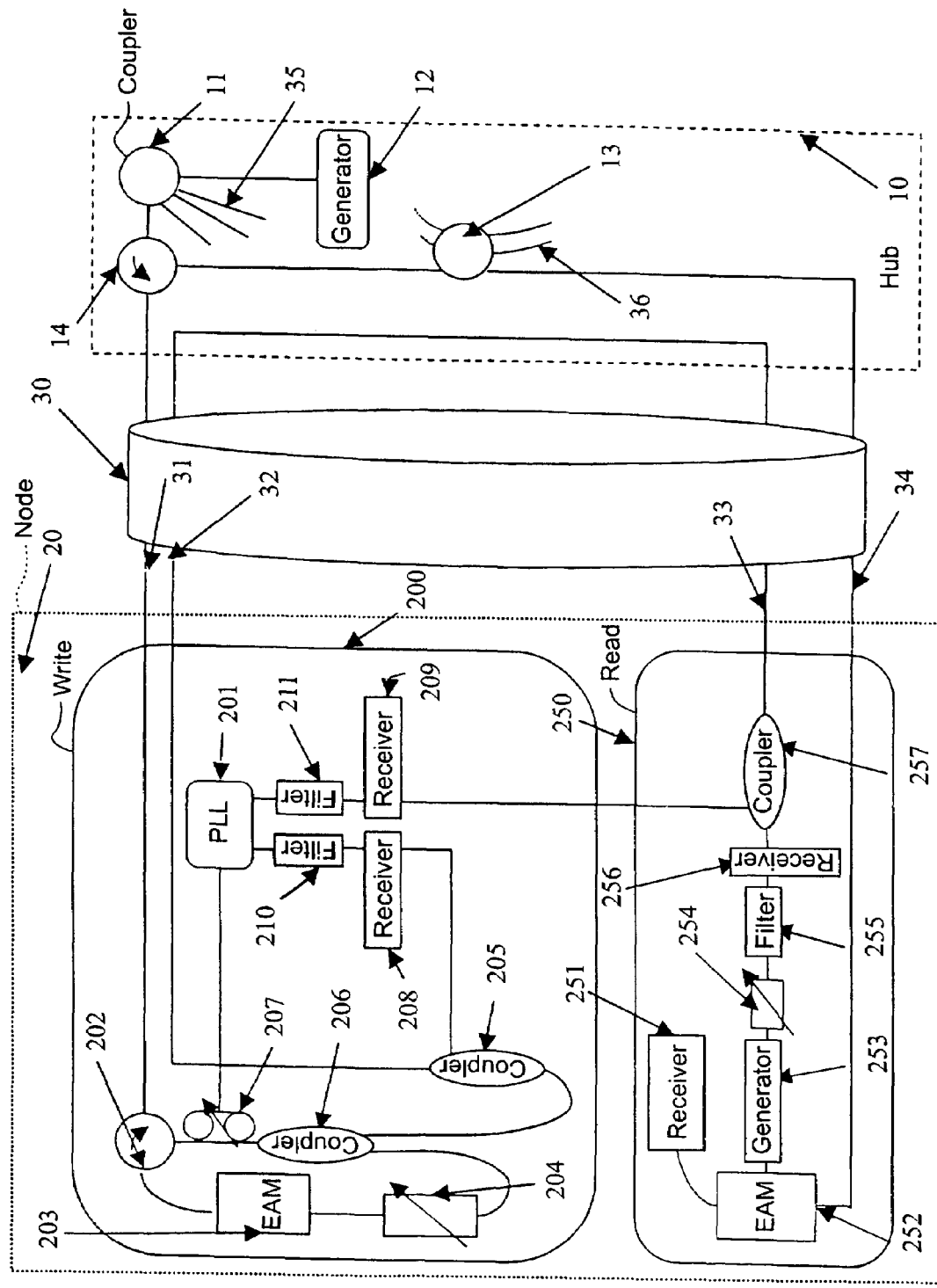
FIG. 2 is a schematic depiction of a first embodiment of an optical switch according to the present invention.

FIG. 2 shows a schematic depiction of the connection of a hub 10 to one of the nodes 20 (only one node is shown in FIG. 2 for the sake of clarity) via optical communications links 30. Hub 10 comprises a 1×N optical coupler 11, optical pulse source 12, N×N optical coupler 13 and optical circulator 14. Hub 10 is connected to node 20 by optical communications links 31, 32, 33 & 34. Node 20 comprises write module 200 and read module 250. Write module 200 comprises phase locked loop (PLL) 201, optical circulator 202, electro-absorption modulator (EAM) 203, variable optical delay 204, optical 1×2 couplers 205 & 206, fibre stretcher 207, optical receivers 208 & 209 and band pass filters 210 & 211. Read module 250 comprises optical receiver 251, electro-absorption modulator 252, impulse generator 253, variable micro phase shifter 254, band pass filter 255, optical receiver 256 and optical 1×2 coupler 257.

Optical pulse generator 12 generates a stream of short optical pulses, for example picosecond duration pulses, that is transmitted to 1×N optical coupler 11. Optical coupler 11 has an output leg for each node 20 that the hub 10 is in communication with and may have additional, unused output legs for connection to additional nodes 20 if the switch is to be extended. FIG. 2 shows one particular node 20; in this case the respective output leg of the optical coupler 11 is connected to optical circulator 14, which forwards the pulse stream to node 20 via optical communications link 31. For the other nodes (not shown in FIG. 2) the pulse stream is transmitted over optical communication links 35 to the optical circulators (also not shown in FIG. 2) associated with those nodes. Thus, the pulse stream generated by the optical pulse generator 11 is distributed to all of the nodes 20 that are connected to the hub 10.

Hub 10 also comprises N×N optical coupler 13, the inputs of which are connected to each of the circulators 14 in the hub 10. The outputs of the N×N optical coupler 13 are connected to the node shown in FIG. 2 by optical communication link 34. Optical communication links 36 connect the outputs of N×N optical coupler 13 to respective hubs 20 (not shown in FIG. 2). Thus, each of the hubs 20 is inter-connected so that any signals transmitted from hub 20 to the node along optical communication link 31 will pass through N×N optical coupler 13 and then be sent to all of the other nodes 20.

Write module 200 of node 20 receives the optical clock pulse from optical communication link 31 at circulator 202.

The clock pulse is sent through fibre stretcher 207, which controlled by the phase locked loop (PLL) 201. Two copies of the clock pulse are then made by optical 1×2 coupler 206.

One of the output legs of optical 1×2 coupler 206 is connected to variable optical delay 204 and then EAM 203. Data to be switched through the optical switch (i.e. to one of the other hubs connected to the node) is modulated onto each pulse of the pulse comb. Modulated data pulses are fed into optical circulator 202 and transmitted over optical communication link 31 to optical circulator 14, which directs the data pulses to the N×N optical coupler 13, which distributes the data pulses to all of the nodes connected to the hub. Optical communication link 34 carries the output of the N×N optical coupler 13 to the read module 250 of the node 20 and this output will be the combination of the data pulses from the write modules 200 of each of the nodes connected to the hub. In order to prevent the various data pulses from interfering with each other it is necessary to provide a separation mechanism. The preferred mechanism is time division multiplexing the different data pulses; the variable optical delay 204 adds a time delay with respect to the received clock pulse before the data is modulated onto the clock pulses. The delay added in each different node 20 is chosen such that data pulses from all of the nodes can successfully coexist within the same communication link.

The other output leg of optical 1×2 coupler 206 is connected to the input leg of optical 1×2 coupler 205. Clock pulses are transmitted to the PLL 201 via one of the output legs of optical 1×2 coupler 205, the optical receiver 208 and band pass filter 210. The second output leg of optical 1×2 coupler 205 is transmitted to read module 250 of the node 20 via optical communication link 32, hub 10 and optical communication link 33. The clock pulse stream is returned to the write module 200 by optical 1×2 coupler 257 and is fed to the PLL 201 via optical receiver 209 and band pass filter 211.

In order for the data pulses from the different nodes to retain the desired time separation it may be necessary to change the path length that the data pulses propagate over; this allows for the compensation of changes in temperature, especially when nodes are not co-located and thus may be subject to different environmental conditions. The PLL controls the fibre shifter to decrease the optical path length to enable the data pulse from the respective node to 'speed up' and to increase the optical path length to enable the data pulse from the respective node to 'slow down'.

Read module 250 receives clock pulses from optical communication link 33 and data pulse combs(comprising a data pulse from each of the nodes) from optical communication link 34. Clock pulse are returned to write module 250 via one of the outputs of optical 1×2 coupler 257 (see discussion above). The second output of optical 1×2 coupler 257 is connected to optical receiver 256. The electrical signal generated by optical receiver 256 is passed through band pass filter 255 and variable microwave phase shifter 254. As the data pulses are time division multiplexed to provide a relative time gap between each data pulse, it is possible to determine the arrival time of any of the data pulses at a given node from the arrival of the clock pulse from the write module of the node. This relative time delay is used to determine the shift applied by microwave phase shifter 254 such that the impulse generator 253 can drive the EAM 252 to receive the required data pulse from the data comb, by gating the EAM.

It will be readily understood that the present invention relates to a fabric for an optical switch or router. The method by which a suitable path through the switch (or router) is selected (i.e. the pairing if an input port and an output port), or the method of by which port connection is avoided is immaterial and does not effect the working of the present invention. Although the above description has specifically described a number of components it should be noted that it is the function of the described device that is critical, rather than it's structure. For example, EAM 252 could be replaced by any other optical device that could be used to provide a gate function to 'drop' the selected data pulse from the data comb.

Optical communication links 31, 32, 33 & 34 that connect each node to the hub should have the same optical characteristics so as to minimise the differences in optical path length and other propagation phenomena. The inventor has realised that this result can preferably be achieved by the use of 'blown fibre' optical cables, in which 4 optical fibres are tightly bound in a jacket (see EP-A-0 186 753 and EP-B-0 521 710).

The capacity of the switch fabric will be limited by the temporal width of the clock and data pulses used in the network and the width of the guardbands which will be necessary to prevent adjacent pulses from interfering with each other. The device limitations which will limit the switch capacity will be the capability of the optical pulse generator 12 and the capability of the gating devices to 'drop' a desired pulse whilst maintaining a sufficient extinction ratio such that the gating devices do not add noise by inadvertently 'dropping' a fraction of the pulses that are adjacent the desired pulse.

Figure 3:
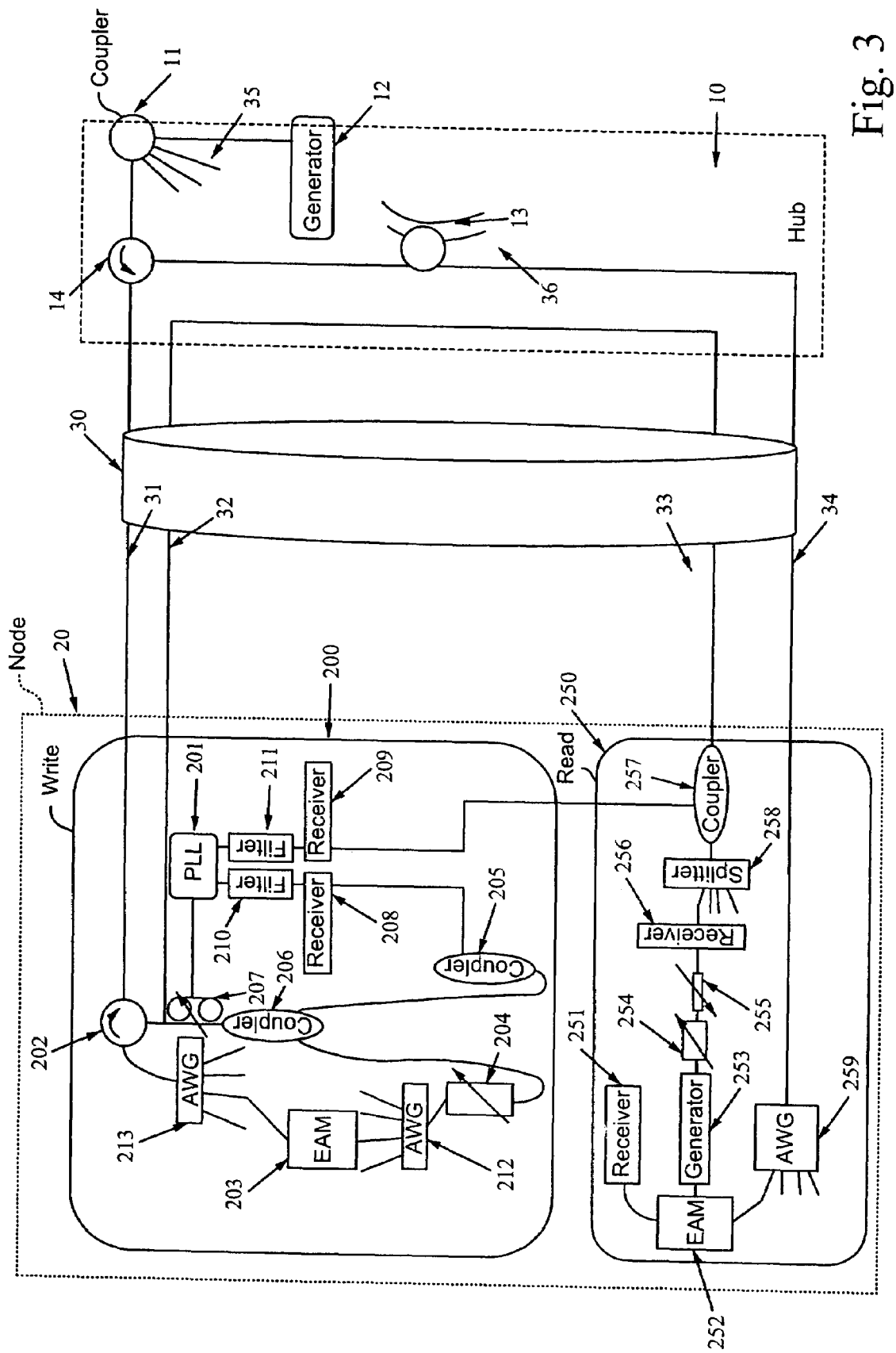
FIG. 3 is a schematic depiction of a second embodiment of an optical switch according to the present invention.

A second embodiment of the present invention is shown in FIG. 3 to provide a multiple wavelength optical switch. Optical pulse generator 12 generates a clock data comb comprising a number of pulses each having a different optical wavelength rather than a single clock pulse as described above. In a similar manner as described above in relation to the first embodiment, the clock data comb is sent from the hub to each of the nodes; each of the nodes re-transmits the clock data comb back to the hub along with a modulated data comb (which has had the correct amount of temporal delay added); the hub transmits all of the data combs to each of the nodes such that a desired data pulse can be dropped from one of the data combs.

In order to achieve this performance, it is necessary to modify the structure of the write module and the read module of the nodes (see FIG. 3). Before the data can be modulated over the different wavelength pulses which comprise the clock comb it is necessary to divide the clock comb into its constituent pulses. Arrayed waveguide 212 is connected to the output of variable optical delay 204 so that each of the different clock pulses can be separated (although FIG. 3 shows only 4 outputs from the arrayed waveguide (AWG) it will be understood that this is an arbitrary value and that the number of wavelengths used will vary with the switch capacity that is desired). Each of the AWG outputs is connected to an electro-absorption modulator so that the desired data can be modulated over the clock pulse to generate a data pulse (for the sake of clarity only one of these EAMs is shown in FIG. 3). The outputs of these EAMs are connected to AWG 213 which re-combines the different data pulses to form a multiple wavelength data comb which is transmitted to the hub.

In order for the read module 250 to drop a data pulse from the multiple wavelength data comb it is necessary to add 1×N splitter 258 and arrayed waveguide 259 to the read module (see FIG. 3); additionally the one set of the devices required to drop a data pulse (optical receiver 251, electro-absorption modulator 252, impulse generator 253, variable micro phase shifter 254, band pass filter 255 and optical receiver 256) must be provided for each of the different wavelengths being used in the switch. One of the outputs of coupler 257 is connected to 1×N splitter 258 (where N is the number of wavelengths being used in the switch), which creates a copy of the clock pulse for each of the sets of devices needed to drop the data pulses. For the sake of clarity FIG. 3 shows both 1×N splitter 258 and AWG 259 as having only four outputs and only one set of receiving devices is shown. AWG 259 splits the data comb into its constituent data pulses, each of which has an associated set of receiving devices such that the read node can simultaneously drop all N pulses from a data comb.

The use of the multiple wavelengths turns the switch into a wavelength-and time-division multiplexed switch, further increasing the capacity of the switch. However, the use of the different wavelengths causes an additional problem as the different wavelengths will propagate at different speeds in the optical fibres 30. In order to prevent wavelength-dependent temporal skew (i.e. some of the data pulses getting out of step with other pulses from the same data comb) it is preferred to arrange the waveguides of AWGs 212 and 259 such that the wavelengths that incur the greatest delay in the fibres have the shortest optical path through the AWG and the wavelengths that incur the smallest delay will have a greater path length through the AWG. Suitable selection of the AWG path lengths enables any temporal skew to be removed at the output of the AWG such that all of the data pulses are temporally aligned before being either modulated by EAM 203 or dropped by EAM 252.

What is claimed is:

1. An optical switch, comprising a hub and a plurality of nodes,
   each node being connected to the hub by first optical communication link for clock signals and by second optical communication link for data signals; such that, in use:
   the hub transmits a clock signal to all of the nodes;
   in response to receiving said clock signal, each node re-transmits the clock signal to the hub and transmits a data signal to the hub;
   the hub transmitting each data signal to all of the nodes and returning each re-transmitted clock signal to its respective node, each node processing the retransmitted clock signal to receive a selected data signal.

2. An optical switch according to claim 1, wherein each node generates data signals by modulating the received clock signal.

3. An optical switch according to claim 1, wherein the clock signal comprises a plurality of wavelength division multiplexed pulses and each data signal comprises a plurality of wavelength division multiplexed data pulses.

4. An optical switch, comprising a hub and a plurality of nodes,
   each node being connected to the hub by first optical communication link for clock signals and by second optical communication link for data signals; such that, in use:
   the hub transmits a clock signal to all of the nodes;
   in response to receiving said clock signal, each node re-transmits the clock signal to the hub and transmits a data signal to the hub;
   the hub transmitting each data signal to all of the nodes and returning each re-transmitted clock signal to its respective node, each node processing the retransmitted clock signal to receive a selected data signal;
   wherein the data signal transmitted by each node has a temporal offset relative to the clock signal which is unique to the respective node.

5. An optical switch according to claim 4, wherein the hub transmits each data signal to all of the nodes and returns each re-transmitted clock signal to its respective node, each node determining the respective temporal offset from the retransmitted clock signal to receive a selected data signal.

6. A method of switching optical signals, the method comprising the steps of:
   (a) transmitting a clock signal from a hub to a plurality of nodes;
   (b) re-transmitting the clock signal back to the hub from each node;
   (c) transmitting a data signal from each node to the hub;
   (d) returning the re-transmitted clock signal to each respective node;
   (e) transmitting all of the received data signals from the hub to all of the nodes; and
   (f) at one or more of the nodes, processing the re-transmitted clock signal to select a data signal;
   wherein communication of the clock and data signals between the hub and each of the nodes is passed through at least one optical communication link.

7. A method of switching optical signals, the method comprising the steps of:
   (a) transmitting a clock signal from a hub to a plurality of nodes;
   (b) re-transmitting the clock signal back to the hub from each node;
   (c) transmitting a data signal from each node to the hub;
   (d) returning the re-transmitted clock signal to each respective node;
   (e) transmitting all of the received data signals from the hub to all of the nodes; and
   (f) at one or more of the nodes, processing the re-transmitted clock signal to select a data signal;
   wherein in step (c) the data signal transmitted by each node has a temporal offset relative to the clock signal which is unique to the respective node.

8. A method of switching optical signals, the method comprising the steps of:
   (a) transmitting a clock signal from a hub to a plurality of nodes;
   (b) re-transmitting the clock signal back to the hub from each node;
   (c) transmitting a data signal from each node to the hub;
   (d) returning the re-transmitted clock signal to each respective node;
   (e) transmitting all of the received data signals from the hub to all of the nodes; and
   (f) at one or more of the nodes, processing the re-transmitted clock signal to select a data signal;
   wherein in steps (e) and (f), each node determines the respective temporal offset from the retransmitted clock signal to receive a selected data signal.

9. A method as in claim 6, further comprising each node generating data signals by modulating the received clock signal.

10. A method as in claim 6 wherein the clock signal comprises a plurality of wavelength division multiplexed pulses and each data signal comprises a plurality of wavelength division multiplexed data pulses.

11. An optical switch comprising:
a hub; and
a plurality of nodes each of which is connected to the hub by a first optical communication link for clock signals and by a second optical communication link for data signals, and at least one of which re-transmits a received clock signal transmitted from the hub and at least one of which transmits a data signal to the hub;
wherein the hub transmits each data signal received at the hub to all of the nodes and returns each re-transmitted clock signal received at the hub to its respective node, and at least one of the nodes processes the re-transmitted clock signal to receive a particular data signal.

12. An optical switch as in claim 1, wherein the hub includes at least one of the following: an optical coupler, an optical pulse source and an optical coupler.

13. A method as in claim 6, wherein the hub includes at least one of the following: an optical coupler, an optical pulse source and an optical coupler.

14. An optical switch as in claim 11, the hub includes at least one of the following: an optical coupler, an optical pulse source and an optical coupler.

15. An optical switch as in claim 1, wherein at least one of the nodes includes an optical receiver.

16. A method as in claim 6, wherein at least one of the nodes includes an optical receiver.

17. An optical switch as in claim 11, wherein at least one of the nodes includes an optical receiver.

* * * * *